(12) United States Patent
Ramarao

(10) Patent No.: US 7,409,400 B2
(45) Date of Patent: Aug. 5, 2008

(54) APPLICATIONS OF AN APPLIANCE IN A DATA CENTER

(75) Inventor: Karempudi V. Ramarao, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 527 days.

(21) Appl. No.: 10/889,626

(22) Filed: Jul. 12, 2004

(65) Prior Publication Data

US 2005/0091251 A1    Apr. 28, 2005

Related U.S. Application Data

(60) Provisional application No. 60/513,850, filed on Oct. 22, 2003.

(51) Int. Cl.
*G06F 17/00* (2006.01)
(52) U.S. Cl. .................. 707/101; 707/201; 707/204; 707/102; 704/7
(58) Field of Classification Search .............. None
See application file for complete search history.

(56) References Cited

U.S. PATENT DOCUMENTS

| | | | |
|---|---|---|---|
| 5,544,357 A | 8/1996 | Huei | |
| 6,151,034 A | 11/2000 | Jain et al. | |
| 6,223,193 B1 | 4/2001 | Pau et al. | |
| 6,247,068 B1 | 6/2001 | Kyle | |
| 6,263,332 B1 | 7/2001 | Nasr et al. | |
| 6,317,804 B1 | 11/2001 | Levy et al. | |
| 6,772,413 B2 | 8/2004 | Kuznetsov | |
| 2001/0042081 A1 | 11/2001 | MacFarlane et al. | |
| 2001/0043600 A1 | 11/2001 | Chatterjee et al. | |
| 2003/0041302 A1 | 2/2003 | McDonald e | |
| 2003/0158724 A1* | 8/2003 | Uchida | 704/7 |
| 2003/0163285 A1 | 8/2003 | Nakamura et al. | |

FOREIGN PATENT DOCUMENTS

EP    1239375    9/2002

(Continued)

OTHER PUBLICATIONS

DataPower Technology, Inc., "XA35 XML Accelerator," 2002, 2 pages.

(Continued)

*Primary Examiner*—Charles Rones
*Assistant Examiner*—Belix M Ortiz
(74) *Attorney, Agent, or Firm*—Blakely, Sokoloff, Taylor & Zafman LLP

(57) ABSTRACT

In various embodiments, an appliance may be used to implement various functions. In some embodiments, an appliance may be used with a DBMS server. The appliance may generate a request, and the DBMS server may generate a result. The appliance may transform the result to a different format for return to a requestor corresponding to the request. In still other embodiments, the appliance may be used with a computer system configured to execute other backend applications such as content management systems, filesystems, etc. In other embodiments, the appliance may receive first output data from a first server of a plurality of servers that is to be supplied as first input data to a second server of the plurality of servers. The appliance may be configured to transform the first output data to a first markup language format and to transform the first markup language format to the second format.

22 Claims, 9 Drawing Sheets

FOREIGN PATENT DOCUMENTS

| WO | WO01/468370 | 6/2001 |
|----|----|----|
| WO | WO03/094007 | 11/2003 |

OTHER PUBLICATIONS

DataPower Technology, Inc., "XS40XML Security Gateway," 2003, 4 pages.
DataPower Technology, Inc., Intelligent XML-Aware Network Infrastructure, "XG3™ Technology," printed from http://www.datapower.com/products/index.html on Oct. 14, 2003, 2 pages.
DataPower Technology, Inc., Intelligent XML-Aware Network Infrastructure, "XA35 XML Accelerator Applications," printed from http://www.datapower.com/products/app_za35.html on Oct. 14, 2003, 2 pages.
DataPower Technology, Inc., Intelligent XML-Aware Network Infrastructure, "XA35 XML Accelerator," printed from http://www.datapower.com/produts/xa35.html on Oct. 14, 2003, 3 pages.
DataPower Technology, Inc., Intelligent XML-Aware Network Infastructure, "XS40 XML Security Gateway Applications," printed from http://www.datapower.com/products/app_xs40.html on Oct. 14, 2003, 2 pages.
Sarvega, Inc., "ZESOS™ Technology," 2003, 2 pages.
Sarvega, Inc. "Sarvega XPE 2000," 2003, 1 page.
Sarvega, Inc., The Sarvega XPE 2000: Unlock the Power of XML, 2003, 1 page.
Sarvega, Inc., "XESOS Studio™," 2003, 1 page.
Forum Systems, Inc., White Paper, "SSL: Not Enough for Today's Web Services," 8 pages, no day.
Forum Systems, Inc., Managing & Accelerating XML Web Services Security, "Forum Sentry™," printed from http://www.forumsys.com/products_sentry.html on Oct. 14, 2003, 1 page.
Forum Systems, Inc., Managing & Accelerating XML Web Services Security, "Extended Enterprise Security" printed from http://www.forumsys.com/products-40303-ees.html on Oct. 14, 2003, 1 page.
Forum Systems, Inc., Managing & Accelerating XML Web Services Security, "Forum Sentry™ 1500 Benefits" printed from http://www.forumsys.com/products-40303-benefits.html on Oct. 14, 2003, 1 page.
Forum Systems, Inc., Managing & Accelerating XML Web Services Security, "Forum Sentry™ 1500 Specifications" printed from http://www.forumsys.com/products-40303-specifications.html on Oct. 14, 2003, 2 pgs.
Forum Systems, Inc., Managing & Accelerating XML Web Services Security, "Unique Features" printed from http://www.forumsys.com/products-40303-solutions.html on Oct. 14, 2003, 1 page.
Reactivity, Inc., "Secure XML: Reactivity XML Firewall™," 2003, 3 pages.
Westbridge Technology, "Westbridge XA2500 Security and Management Appliance," 2003, 2 pages.
Westbridge Technology, "XMS Overview," 2003, 2 pages.
Westbridge Technology, "XMS Features," 2003, 4 pages.
Westbridge Technology, "XMS Architecture," 2003, 1 page.
Sarvega, Inc., "Product Features and Technical Specifications," 2003, 1 page.
Fenandez et al., "SilkRoute: Trading Between Relations and XML," Computer Networks 33, www.elsvier.com/locate/comnet, 2000 (723-745).
Banerjee et al., "Oracle 8i—The XML Enabled Data Management System," 2000 IEEE, Oracle Corporation, (pp. 561-568).
Emmerich et al., "Markup Meets Middleware," 1999 IEEE, (pp. 261-266).
Barton et al., "Streaming Xpath Processing with Forward and Backward Axes," 2003 IEEE, (pp. 455-466).
Morton Jorgensen, "XSLTC Documentation," xml.apache.org/xalan-j/xsltc/index.html, Jun. 18, 2006 (4 pages).
Practical Transformation Using XSLT and Xpath (XSL Transformations and the XML Path Language,) ISBN 1-894049-05-5, Eigth Edition, Crane Software, Ltd., Jul. 7, 2000, (122 Pages).
Gupta et al., "Stream Processing of Xpath Queries with Predicates," ACM 1-58113-634, Sigmod 2003, Jun. 9-12, 2003, (pp. 419-430).
G. Ken Holman, "What is XSLT?," http://www.xml.com/pub/a/2000/08/holman/s1.html, Aug. 12-15, 2003, (31 Pages).
G. Ken Holman, "Getting Started with XSLT and XPath," http://www.xml.com/lpt/a/2000/8/holman/s2_1.html, Aug. 12-15, 2003, (15 Pages).
Norman Walsh et al., "What do XML Documents Look Like?" http://www.xml.com/pub/a/98/10/guide2.html, Oct. 3, 1998, (13 Pages).
Norman Walsh, "What is XML?," http://www.xml.com/pub/a/98/10/guide3.html, Oct. 3, 1998, (5 pages).
Norman Walsh, "Pulling the Pieces Together," http://www.xml.com/pub/a/98/10/guide4.html, Oct. 3, 1998, (5 Pages).
Norman Walsh, "Validity," http://www.xml.com/pub/a/98/10/guide3.html, Oct. 3, 1998, (2 Pages).
Maler et al., "XML Linking Language (Xlink)," http://www.w3.org/TR/1998/WD-xlink-19980303.html, Mar. 3, 1998, (15 Pages).
Maler et al., "XML Pointer Language," http://www.w3.org/TR/1998/WD-xptr-19980303.html, Mar. 3, 1998, (19 Pages).
Adler et al., "Extensible Stylesheet Language (XSL) Version 1.0," http://www.w3.org/TR/2000/CR-xsl-20001121.html, Nov. 21, 2000, (11 Pages).
Bray et al., "Extensible Markup Language (XML Edition)," http://www.w3.org/TR/2000/REC-xml-20001006.html, Oct. 6, 2000, (50 Pages).
Clark et al., "XML Path Language (Xpath) Version 1.0," http://www.w3.org/TR/1999/REC-xpath-19991116.html, Nov. 16, 1999, (36 Pages).
James Clark, "XSL Transformations (XSLT) Version 1.0," http://www.w3.org/TR/1999/REC-xslt-19991116.html, Nov. 16, 1999, (102 Pages).
International Search Report, PCT/US2004/035166 mailed Mar. 11, 2005, (13 Pages).
EP0009681 Search Report mailed Jul. 30, 2007, 9 pgs.
Rada, R. et al., "Hypertext Interchange Using ICA," Journal of Documentation, ASLIB. London, GB, vol. 51, Jun. 1, 1995, pp. 99-117.
Wustner, E. et al., "Converting Business Documents: a Classification of Problems and Solutions using XML/XSLT," Advanced Issues of E-Commerce and Web-Based Information Systems, Jun. 26, 2002, pp. 54-61.

* cited by examiner

<primary_key Attr1=Col1 Attr2=Col2 .... AttrN=ColN />

<parent_element Attr1=Col1 Attr2=Col2 .... AttrN=ColN>

<primary_key_Col1 />

<primary_key_Col2 />

:

<primary_key_ColM />

</ parent_element >

APPLICATIONS OF AN APPLIANCE IN A DATA CENTER

This application claims benefit of priority to U.S. Provisional Patent Application Ser. No. 60/513,850, filed on Oct. 22, 2003, which is incorporated herein by reference in its entirety.

BACKGROUND OF THE INVENTION

1. Field of the Invention

This invention is related to the field of processing and transforming structured documents, such as extensible markup language (XML), standardized generalized markup language (SGML), hypertext markup language (HTML), and unstructured data and documents in databases and/or filesystems in a data center.

2. Description of the Related Art

As networking has become ubiquitous, the data center has emerged as an important service to the computing world. Generally, a data center may comprise various servers providing application service to the user, including access to various databases that may be maintained in the data center as well as other application services such as content management services, filesystem services, etc.

Unfortunately, various applications may generate data in different formats and/or in a different format than that desired by the user. Furthermore, different users may desire different formats for their data. Accordingly, application servers, web servers, and/or the user's computer system may often be tasked with converting between various formats. The conversion software consumes computing resources, reducing the effectiveness of the servers at the tasks for which they were originally designed. Additionally, the latency experienced by the user when using the services of the data center may be increased.

SUMMARY OF THE INVENTION

In some embodiments, an appliance and method is contemplated for use with a computer system executing a database management system DBMS. The appliance is configured to generate a request. The computer system is coupled to the appliance to receive the request, and the DBMS is configured to process the request in at least one of the one or more databases. The computer system is configured to return a result of the request to the appliance in a first format. The appliance is configured to transform the result to a second format for return to a requester corresponding to the request. An apparatus comprising the appliance and the computer system is also contemplated. In still other embodiments, the appliance may be used with a computer system configured to execute other backend applications such as content management systems, filesystems, etc.

In other embodiments, an appliance and method may be used with a plurality of servers. The an appliance coupled to the plurality of servers, and may receive first output data from a first server of the plurality of servers. The first output is to be supplied as first input data to a second server of the plurality of servers, wherein the first output data is in a first format different than a second format used by the second server for the first input data. The appliance is configured to transform the first output data to a first markup language format and to transform the first markup language format to the second format. An apparatus comprising the appliance and a plurality of servers is also contemplated.

In yet further embodiments, the appliance may implement other functions in a datacenter or other computing facility. For example, the appliance may implement a rendering engine, an XML router, a firewall (e.g. virus detection), etc.

BRIEF DESCRIPTION OF THE DRAWINGS

The following detailed description makes reference to the accompanying drawings, which are now briefly described.

Figure 1:
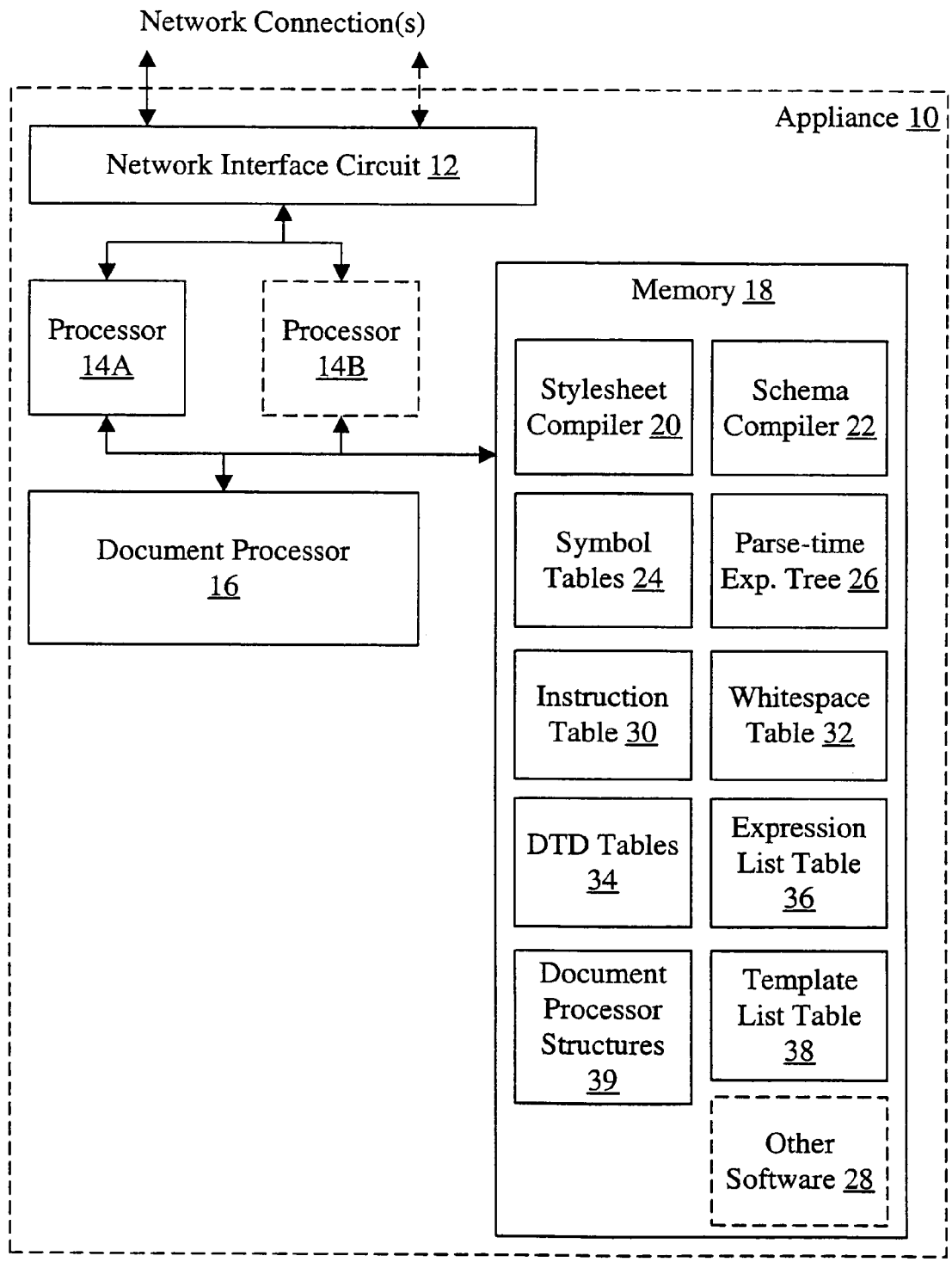
FIG. 1 is a block diagram of one embodiment of a appliance.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Appliance Overview

Turning now to FIG. 1, a block diagram of one embodiment of an appliance 10 is shown. In the embodiment of FIG. 1, the appliance 10 may include a network interface circuit 12, one or more processors such as processors 14A and optionally 14B, a document processor 16, and a memory 18. The network interface circuit 12 is coupled, via one or more network connections, to a network or networks. Various computer systems (not shown in FIG. 1) may also be coupled to the network or networks. The network interface circuit 12 is also coupled to the processors 14A-14B. The processors are coupled to the memory 18 and to the document processor 16, which is also coupled to the memory 18. In the illustrated embodiment, the memory 18 stores a stylesheet compiler 20, a schema compiler 22, one or more symbol tables 24, one or more parse-time expression trees 26, an instruction table 30, a whitespace table 32, document type definition (DTD) tables 34, an expression list table 36, a template list table 38, various document processor data structures 39, and optionally other software 28.

Generally, the appliance 10 may be configured to provide one or more services for other computer systems that may be included in a data center. Various examples given below may include a database proxy, a rendering engine, a data integration switch, a markup language router, and a firewall, although these examples are not intended to be exhaustive. The appliance 10 may include hardware/software designed to transform input documents to output documents, in some cases according to a transformation specified by a stylesheet. The various services handled by the appliance 10 may, in some cases, use the transformation functionality to accomplish the desired services. The appliance 10 may be used to offload services from servers in a data center, permitting the servers to dedicate more resources to the services that the servers were designed to provide. As used herein, the term "appliance" may refer to any combination of hardware and optionally software that is sold as a unit for installation on a network. The appliance may typically be designed to be installed on the network with relatively little, if any, configuration (as compared to a general purpose computer system such as a server or personal computer, for example), and may typically be designed to operate with relatively little, if any, support. If software is included in the appliance, the software is typically preinstalled in the appliance (although software upgrades may be downloaded to the appliance or additional software may be installed onto the appliance, in some embodiments, via the network). An administrator may access the appliance, in some embodiments, via the network (e.g. a web browser interface may be provided).

As used herein, the term "document" refers to any content that has a corresponding defined structure that can be used to interpret the content. The content may be highly structured (such as an XML document, HTML document, pdf document, word processing document, database, etc.) or may be as simple as a plain text document (whose structure may be, e.g., a stream of characters) or data (whose structure may be, e.g., a set of data items arranged in a particular order). Examples of various applications of the appliance 10 described below may provide document content that comprises a request (e.g. to access a database), data, or other types of documents.

In some cases, the appliance 10 may receive, via the network connections, stylesheets to be applied to documents, schema to be applied to documents, and/or the documents themselves (with a request to apply a stylesheet/schema to the document). In response to a request to apply a stylesheet, the appliance 10 may apply the stylesheet to the document and generate a transformed document to be transmitted through the network to the request or (or to another destination specified by the request or). In some embodiments, the appliance 10 may also receive a request to parse a document (e.g. into a defined format such as simple application programming interface (API) for XML (SAX) or document object model (DOM)). In response to a request to apply a schema (or DTD), the appliance 10 may validate the document according to the schema or DTD and generate a success message or a fail message (with an indication of the failure) to the requestor.

In other cases, the appliance 10 may receive a request, and may include other software 28 to interpret the request. The appliance 10 may generate communications to other network devices (e.g. servers) based on the request, and may also use the transformation functionality to aid in handling the request.

In one embodiment, the transformation functionality may be optimized for XML documents and the corresponding XML stylesheet language for transformation (XSLT). Additional details related to XML and XSLT stylesheets are given below. XSLT is based on the XPath language for expressions. XQuery, an additional language being developed that is based on XPath, may also be used in other embodiments. Still further, other embodiments may be based on any markup language and corresponding expression languages. Generally, a "markup language" is any language that may be used to define the structure of a document's content. The markup may generally include various tags that identify content and may provide information about the nature of the content. For example, XML permits element tags to be defined, which may be used to describe the structure of the content. Additionally, elements may include various attributes which further describe the element or provide additional information about the content.

An XML document has a hierarchical tree structure, where the root of the tree identifies the document as a whole and each other node in the document is a descendent of the root. Various elements, attributes, and document content form the nodes of the tree. The elements define the structure of the content that the elements contain. Each element has an element name, and the element delimits content using a start tag and an end tag that each include the element name. An element may have other elements as sub-elements, which may further define the structure of the content. Additionally, elements may include attributes (included in the start tag, following the element name), which are name/value pairs that provide further information about the element or the structure of the element content. XML documents may also include processing instructions that are to be passed to the application reading the XML document, comments, etc. Generally, a "node" of a document may include structural definition (e.g. elements and/or attributes in XML) and/or document content. In one embodiment, a node may include elements, attributes, processing instructions, comments, and text.

An XSLT stylesheet may be viewed as a set of templates. Each template may include: (i) an expression that selects nodes in the source document's tree structure; and (ii) a body that specifies a corresponding portion of the output document's structure to be instantiated for each matching node of the source document. Applying a stylesheet to a source document may comprise attempting to find a matching template for each node in the source document, and instantiating the body of the matching template in the output document's tree. The body of the template may include one or more of: (i) literal content to be instantiated in the output document; (ii) selection of content from the matching nodes to be copied into the output document; and (iii) statements that are to be evaluated, with the result of the statements being instantiated in the output document. Together, the content to be instantiated and the statements to be evaluated may be referred to as "actions" to be performed on the nodes that match the template. The body of the template may include one or more "apply templates" statements, which include an expression selecting one or more nodes and causing the templates in the stylesheet to be applied to the selected nodes, thus effectively nesting the templates. If a match to the apply templates statement is found, the resulting template is instantiated within the instantiation of the template that includes the apply templates statement. Other statements in the body of the template may also include expressions to be matched against nodes (and the statements may be evaluated on the matching nodes). While XSLT stylesheets may be used in one example herein, generally a "stylesheet" may comprise any specification for transforming a source document to an output document. The source and output documents may be in the same language (e.g. the source and output documents may be different XML vocabularies), or may differ (e.g. XML to pdf, etc.). Another example of stylesheets may be cascading stylesheets defined for HTML and/or XML Query.

The expressions used in a stylesheet may generally comprise node identifiers and/or values of nodes, along with operators on the node identifiers to specify parent/child (or ancestor/descendant) relationships among the node identifiers and/or values. Expressions may also include predicates, which may be extra condition(s) for matching a node. A predicate is an expression that is evaluated with the associated node as the context node (defined below), where the result of the expression is either true (and the node may match the expression node) or false (and the node does not match the expression). Thus, an expression may be viewed as a tree of nodes to be matched against a document's tree. In XPath, the expression language used in XSLT, an expression may be evaluated in the context of a "context node" as well (that is, expressions may be relative to the context node, specifying node names in the expression as ancestors, descendents, parents, or children of the context node as well as relationships to other node names). A given document node may satisfy an expression if the given document node is selected via evaluation of the expression. That is, the expression node identifiers in the expression match the given document node's identifier or document node identifiers having the same relationship to the given document node as specified in the expression, and any values used in the expression are equal to corresponding values related to the given document node. A document node may also be referred to as a "matching node" for a given expression if the node satisfies the given expression. In some cases in the remainder of this discussion, it may be helpful for clarity to distinguish nodes in expression trees from nodes in a document. Thus, a node may be referred to as an "expression node" if the node is part of an expression tree, and a node may be referred to as a "document node" if the node is part of the document being processed. A node identifier may comprise a name (e.g. element name, attribute name, etc.) or may comprise an expression construct that identifies a node by type (e.g. a node test expression may match any node, or a text test expression may match any text node). In some cases, a name may belong to a specific namespace. In such cases, the node identifier may be a name associated with a namespace. In XML, the namespace provides a method of qualifying element and attribute names by associating them with namespace names identified by a universal resource identifier (URI). Thus, the node identifier may be the qualified name (the optional namespace prefix, followed by a colon, followed by the name). A name, as used herein (e.g. element name, attribute name, etc.) may include a qualified name.

In the illustrated embodiment, applying the stylesheets to documents may be performed in the following manner: The stylesheet compiler 20 may comprise software (i.e. a plurality of instructions) executed on one of the processors 14A-14B to compile the stylesheet into one or more data structures and code for use by the document processor 16. The document processor 16 may apply the data structures to the source document and generate the output document.

Particularly, in one embodiment, the stylesheet compiler 20 may assign serial numbers to node identifiers so that expression evaluation may be performed by the document processor by comparing numbers, rather than node identifiers (which would involve character string comparisons). The stylesheet compiler 20 may store a mapping of node identifiers to serial numbers in the symbol tables 24. Additionally, the stylesheet compiler 20 may extract the expressions from the stylesheet and generate expression tree data structures to be used by the document processor for expression matching (e.g. the parse-time expression tree 26). Still further, the stylesheet compiler 20 may generate an instruction table 30 with instructions to be executed for each matching expression (and also instructions to be executed to evaluate run-time predicates, in one embodiment). The instructions in the instruction table, when executed by the document processor 16, may result in performing the actions defined to be executed when the expression is matched. In some embodiments, the instructions may comprise the actions to be performed (i.e. there may be a one-to-one correspondence between instructions and actions). In other embodiments, at least some actions may be realized by executing two or more instructions. The stylesheet compiler 20 may also generate whitespace tables 32 defining how various types of whitespace in the source document are to be treated (e.g. preserved, stripped, etc.), an expression list table 36 and a template list table 38.

The schema compiler 22 may similarly comprise instructions executed on one of the processors 14A-14B. The schema compiler 22 may compile a schema or DTD to generate one or more symbol tables 24 (replacing node identifiers with serial numbers) as well as the DTD tables 34. Generally, a DTD or schema may comprise a definition of both the permissible document structure and the required document structure. An author of the document may thus describe, with a DTD and/or schema, the required and permitted structure of a valid document. In some cases, the DTD or schema may also include default values for attributes. In one embodiment, the DTD/schema may include a variety of information: entity declarations that are used to replace entity references in the document, attributes of a given element that are required attributes for a valid document, attribute default values for attributes that may not be specified in a given element of the document, requirements for the structure of the document (e.g. a required minimum/maximum/specific number of a certain subelement, etc.), and a definition of the permissible structure of the document. The DTD tables 34 may include a table of the entity reference replacements, a table of the required attributes, a table of the attribute defaults, and a skeleton tree identifying the permissible structure (and required structure, if applicable).

The document processor 16 may comprise hardware circuitry to parse the document and to match document nodes to expression nodes in the parse-time expression tree. That is, the hardware circuitry that parses the document and matches document nodes to expression nodes may perform these operations without executing any software instructions. The hardware may generate various data structures storing the parsed content and indications, for each expression, of the matching document nodes. The hardware may then execute the instructions from the instruction table 30 for a given expression on each matching document node of that given expression, generating results which are then combined to produce the output document. Additional details of one embodiment are provided below.

As mentioned above, in the illustrated embodiment, the stylesheet compiler 20 and the schema compiler 22 are implemented in software and the document processor 16 is implemented in hardware. In some embodiments, the critical factor in the performance of the appliance 10 may be the processing of the document when a transformation request is made and the document is provided. That is, stylesheets and/or schemas may, in many cases, change relatively infrequently as compared to the number of documents being processed. A given stylesheet may be applied to multiple documents (e.g. at least on the order of tens of documents) prior to the stylesheets being changed (to an updated stylesheet or to a different stylesheet altogether). A similar relationship may hold for schema and the documents to which they are to be applied. Accordingly, capturing the relatively invariant information from the stylesheets/schema (using software) into data structures that may be efficiently accessed by dedicated, custom hardware may provide a high performance solution. Additionally, having stylesheet/schema compilation in hardware may provide, in some embodiments, flexibility to implement different stylesheet/schema languages and/or to implement changes in the language specifications without having to change the custom hardware. For example, XSLT, XPath, and XML schema may be still evolving, and new features may be added to these languages in the future. The compilers may be adapted to handle these new features. The stylesheet/schema to be used may be provided beforehand, and thus the time to compile the stylesheet/schema may be less critical. However, in other embodiments, one or both of the stylesheet compiler 20 and the schema compiler 22 may be implemented in hardware, or a combination of hardware and software.

The network interface circuit 12 may handle the low-level electrical and protocol details on the network connections, and may pass received packets to the processors 14A-14B for processing. Any type of network may be used. For example, in some embodiments, the network connections may be Gigabit Ethernet connections. More than one connection may be provided, as desired, to achieve a given level of bandwidth and/or to provide redundancy in the network connections.

The processors 14A-14B may comprise any type of processor. For example, in one embodiment, the processors 14A-14B may be PowerPC network processors. In other embodiments, the processors 14A-14B may implement other instruction set architectures such as ARM, Intel's IA-32, MIPS, etc.

Any interconnect may be used to couple the processors 14A-14B, the document processor 16, and the memory 18. Furthermore, the processors 14A-14B may be coupled to the document processor 16 separate from the connection of the processors 14A-14B and the document processor 16 to the memory 18. For example, in one implementation, the processors 14A-14B may be coupled to the document processor 16 using one or more peripheral component interconnect express (PCI-X) buses.

It is noted that, in some cases, a DTD, schema, or stylesheet may be embedded in a document (either directly or as a pointer to the schema or stylesheet). In such cases the DTD, schema, or stylesheet may be extracted from the document and processed as described for a separately-provided schema or stylesheet.

The memory 18 may comprise any type of volatile or non-volatile memory. For example, the memory 18 may include one or more of RAM (e.g. SDRAM, RDRAM, SRAM, etc.), non-volatile memory such as Flash memory or battery-backed RAM, magnetic or optical storage such as disk or CD-ROM, etc. The memory 18 may comprise multiple memories that are separately accessible (e.g. a partition or partitions accessible only to the processors 14A-14B and another partition or partitions accessible only to the document processor 16).

FIG. 1 illustrates the stylesheet compiler 20, the schema compiler 22, and the other software 28 stored in the memory 18. Generally, the stylesheet compiler 20, the schema compiler 22, and/or the other software 28 may be encoded on any computer accessible medium. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, volatile or non-volatile memory media such as RAM (e.g. SDRAM, RDRAM, SRAM, etc.), ROM, Flash memory, etc., as well as media accessible via transmission media or signals such as electrical, electromagnetic, or digital signals, conveyed via a communication medium such as a network and/or a wireless link.

In some embodiments, the computer accessible medium may be included in a separate computer system or systems which may execute the stylesheet compiler 20 and/or the schema compiler 22 to perform the compilation. The data structures/code resulting from the compilation may be communicated to the appliance 10 (e.g. through the network connection to the appliance 10).

It is noted that, while the description herein may include examples in which a stylesheet is applied to a document, other examples may include applying multiple stylesheets to a document (either concurrently or serially, as desired) and applying a stylesheet to multiple documents (either concurrently with context switching or serially, as desired).

Figure 2:
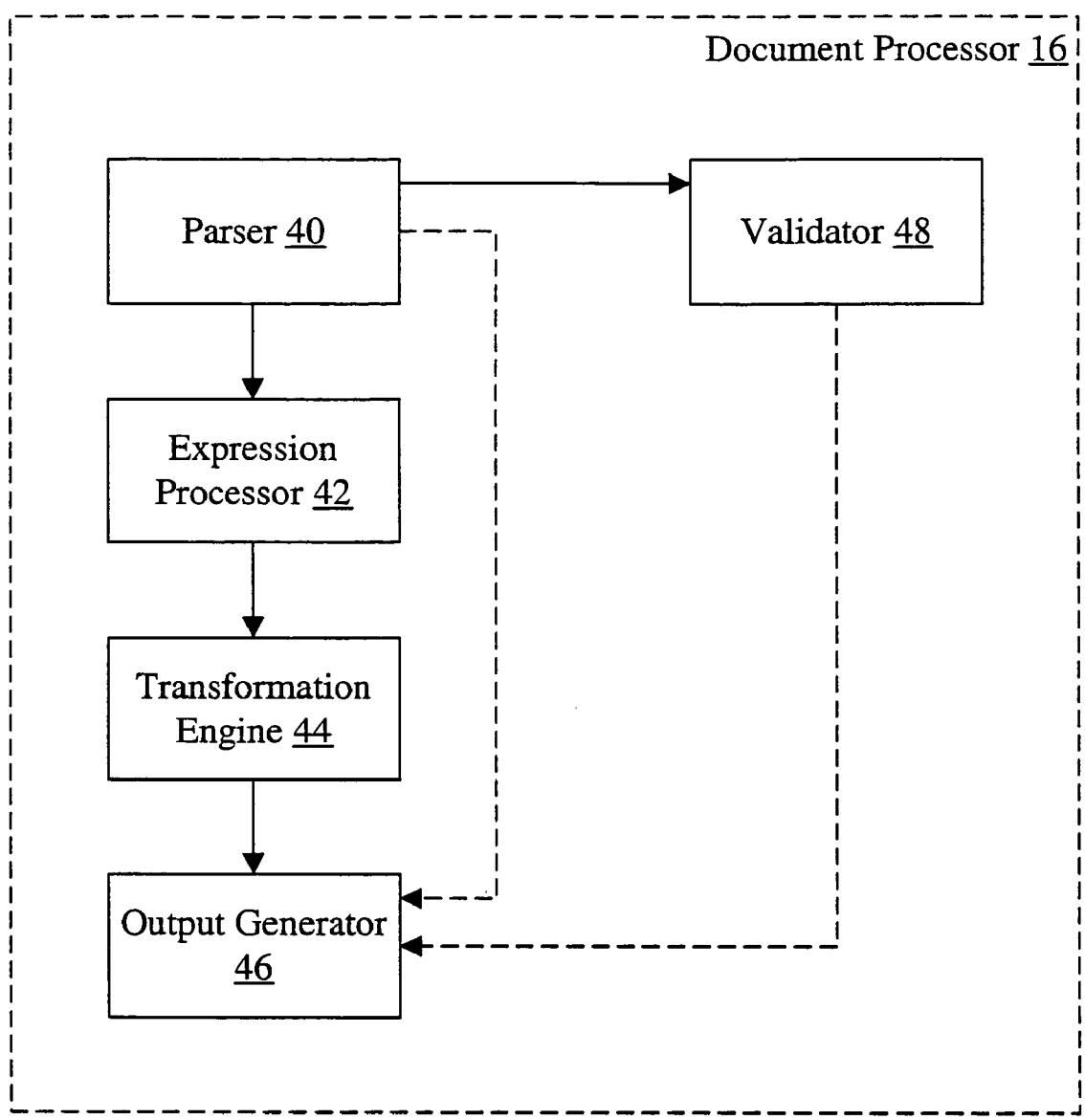
FIG. 2 is a block diagram of one embodiment of document processor shown in FIG. 1.

Turning next to FIG. 2, a block diagram of one embodiment of the document processor 16 is shown. In the embodiment of FIG. 2, the document processor 16 includes a parser circuit 40, an expression processor 42, a transformation engine 44, an output generator 46, and a validator circuit 48. The parser circuit 40 is coupled to the expression processor 42 and to the output generator 46. The expression processor 42 is coupled to the transformation engine 44, which is coupled to the output generator 46. The validator 48 is coupled to the output generator 46. Units in FIG. 2 may be coupled to each other directly (e.g. using signal lines between the units), may be coupled through the memory 18 (e.g. a source unit may write information to be communicated to a destination unit to the memory 18, and the destination unit may read the information from the memory 18), or both.

The parser circuit 40 may receive a document and parse the document, identifying events for the expression processor 42 and the validator circuit 48, and also generating data structures with the parsed content. If the document processor 16 is to transform the document according to a stylesheet, the parsed content may be stored in data structures in memory 18 for the transformation engine 44. Alternatively, if the document is to parsed only, the parser circuit 40 may provide the output generator 46 with the parsed content to be output in SAX or DOM format. The parser circuit 40 may provide the output generator 46 with the parsed content through memory 18 as well.

In one embodiment, the parser circuit 40 may accesses the symbol tables 24, the DTD tables 34, and the whitespace tables 32 from the memory 18. The parser circuit 40 parses the document and generates events related to the detected document nodes. More particularly, the parser circuit 40 converts the node identifiers in the document to the corresponding serial numbers in the symbol tables 24, and transmits the serial numbers as part of the events to the expression processor 42 (and the validator circuit 48). Additionally, the parser circuit 40 generates parsed content tables storing the parsed content of the document for the transformation engine 44.

The expression processor 42 receives events from the parser circuit 40 (identifying document nodes parsed from the document), and compares document nodes identified by the parser circuit 40 against the parse-time expression tree 26.

The expression processor 42 outputs lists of matching document nodes for each expression to the transformation engine 44. The transformation engine 44 receives the data structures of parsed content built by the parser circuit 40 and the lists of matching document nodes, and executes the corresponding instructions from the instruction table 30 to generate the results for the output document. The transformation engine 44 may also evaluate any run-time expressions and eliminate document nodes from the template and expression match lists that do not satisfy the run-time expressions. In some embodiments, each instruction may be independent of the others, and thus execution may occur in any order. The output generator 46 may reassemble the results in order and may write the output document to the memory 18 (or may send the output document to the processors 14A-14B without passing through the memory 18). The processors 14A-14B may execute software to read the output document and transmit the output document to the requester.

In one particular implementation, the parser circuit 40 may receive the document inline, and the parser circuit 40 may transmit events to the expression processor 42 inline as well. That is, as the portions of the document are received and reassembled (e.g. by the processor 14A), the processor 14A passes the portion of the document to the parser circuit 40. The parser circuit 40 may thus begin parsing prior to the processor 14A receiving the entirety of the document. Similarly, the events are passed to the expression processor 42 as they are identified. On the other hand, the parsed content tables and template/expression match lists are passed through the memory 18 (indicated by the dotted oval over the communications to the transformation engine 44).

The validator circuit 48 may also receive the events sent by the parser circuit 40 and may apply the schema/DTD (as represented by the skeleton tree and DTD tables 34), and may determine if the document is valid as indicated in the schema. If the document is valid, the validator circuit 48 may generate a success message to be transmitted to the output generator 46. If the document is not valid, the validator circuit 48 may generate a fail message (indicating the reason(s) for failure) and may transmit the fail message to the output generator 46. The output generator 46 may store the message to the memory 18 (and the processors 14A-14B may subsequently transmit the message to the request or).

Data Center Overview

Figure 3:
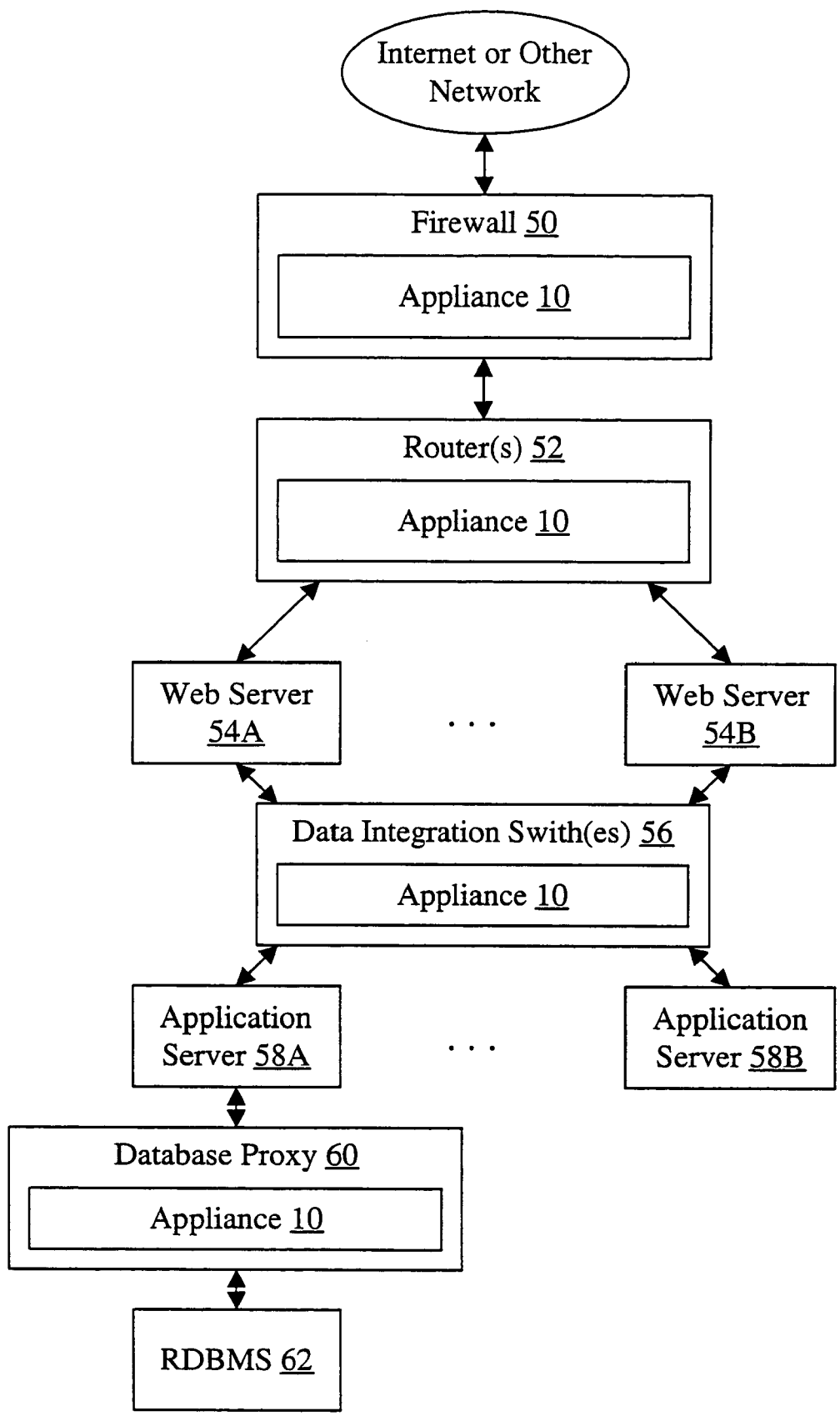
FIG. 3 is a block diagram of one embodiment of a data center including one or more appliances.

Turning now to FIG. 3, a block diagram illustrating one embodiment of a data center in which the appliance 10 may be used for various purposes is shown. The data center may be coupled to the Internet or to any other desired network (e.g. local area network (LAN), metropolitan area network (MAN), wide area network (WAN), wireless network, etc. or any combination of the above networks). The data center may include a firewall 50 (that may, in some embodiments, include one or more instances of the appliance 10), one or more routers 52 (that may, in some embodiments, include one or more instances of the appliance 10), web servers such as web servers 54A-54B, one or more data integration switches 56 (that may, in some embodiments, include one or more instances of the appliance 10), application servers such as application servers 58A-58B, a database proxy 60 (that may, in some embodiments, include one or more instances of the appliance 10), and a server 62 running a relational database management system (RDBMS).

The couplings shown in FIG. 3 may be logical. That is, various logical communication paths are illustrated in FIG. 3. Thus, the firewall 50 may be logically coupled to the router(s) 52, which may be logically coupled to the web servers 54A-54B (and potentially the application servers 58A-58B). The data integration switches 56 may be logically coupled to the web servers 54A-54B and the application servers 58A-58B. The application server 54A may be logically coupled to the database proxy 60, which is logically coupled to the RDBMS server 62. Physically, the various devices shown in FIG. 3 may be coupled to a network (e.g. LAN, WAN, MAN, wireless, etc., or combinations thereof), to multiple separate networks that are geographically near or geographically distributed, etc. Exemplary networks may include Ethernet networks, Token Rings, etc.

The firewall 50 may protect the data center from unauthorized access/attack from the Internet or other network. In some embodiments, the appliance 10 may be implemented within the firewall 50 to detect viruses in documents being provided to the data center. An exemplary embodiment is described below with regard to FIG. 13.

The router(s) 52 may receive packets that pass through the firewall, and may route the packets within the data center to the appropriate receiver (e.g. a web server, application server, etc.). In some embodiments, the appliance 10 may be used as an XML router, routing XML packets. An exemplary embodiment is described below with regard to FIG. 12.

The web servers, such as web servers 54A-54B, may generally be responsible for supplying web content (e.g. web pages) in response to requests for the web content from the external network (e.g. Internet or other network). In some cases, the web servers may communicate with the application servers if a portion of the web content is drawn from an application (such as the RDBMS).

The application servers, such as application servers 58A-58B, are configured to provide application services. Generally, application servers provide the interface between the backend applications in the data center (e.g. the RDBMS, a content management system, a filesystem, etc.) and the users making requests (e.g. from the Internet or other network).

As mentioned above, in some cases the web servers 54A-54B may communicate with the application servers 58A-58B and vice versa. However, in some cases, the format of the data output by one server and destined for another server may not match the format expected by that other server. The data integration switches 56 may be used to convert the data format output by a source server to the format required by the destination server. In some embodiments, the appliance 10 may be used as a data integration switch 56. An exemplary embodiment is discussed below with regard to FIGS. 9-11.

Generally, as used herein, a "server" may comprise a computer system that may include software designed to provide the service(s) assigned to the server.

The application server 58A in the illustrated embodiment is configured to provide application interface to the RDBMS server 62. However, in some cases, the application server 58A may be configured to communicate with the RDBMS server 62 in a different fashion than the RDBMS server 62 is configured to communicate. For example, the application server 58A may view the database as XML, whereas the database may have a relational data format. In another embodiment, the database may store XML objects, wherein the content of the object is the data of interest to an application, but the application server 58A may expect a relational data formatted output (e.g. records, each record having multiple columns, or fields, of information) or other format for the data.

The database proxy 60 may be included as a "frontend" to the RDBMS server 62. The database proxy 60 may communicate with the application server 58A in the manner that the application server 58A expects, and may communicate with the RDBMS server 62 in the manner that the RDBMS server

62 expects. The database proxy 60 may thus convert the communications from one form to another. In some embodiments, the appliance 10 may be used as a database proxy 60. Exemplary embodiments are described below with regard to FIGS. 4-7.

The RDBMS server 62 executes the RDBMS. While the illustrated embodiment may implement a relational database (in which a record is stored in various related tables, to permit flexibility in searching the database for specific records based on different fields), other embodiments may implement non-relational databases (e.g. flat-file databases), if desired. Exemplary RDBMS's may include structured query language (SQL) databases such as Oracle, DB2, etc. Generally, as used herein, a database management system (DBMS) may comprise software that permits entry of data into the database, permits searching of the database, organizes data in the database, etc. An RDBMS is the DBMS software for a relational database.

In other embodiments, a server may execute a content management system (which may manage access and update to content by multiple users, where content may include software source code, documents, or any other data files), a filesystem, etc. and the proxy 60 may be used as a frontend similar to the database proxy.

It is noted that, while the appliance 10 is illustrated in various locations in FIG. 3, various embodiments may implement the appliance 10 at any of one or more of the illustrated locations, as desired. Furthermore, while the applications of the appliance 10 in FIG. 3 are shown in the context of the data center, each application may be used outside of a data center, in other environments.

Appliance Applications

Turning next to FIGS. 4-13, various applications of the appliance 10 are illustrated in more detail.

Figures 4, 5, 6:
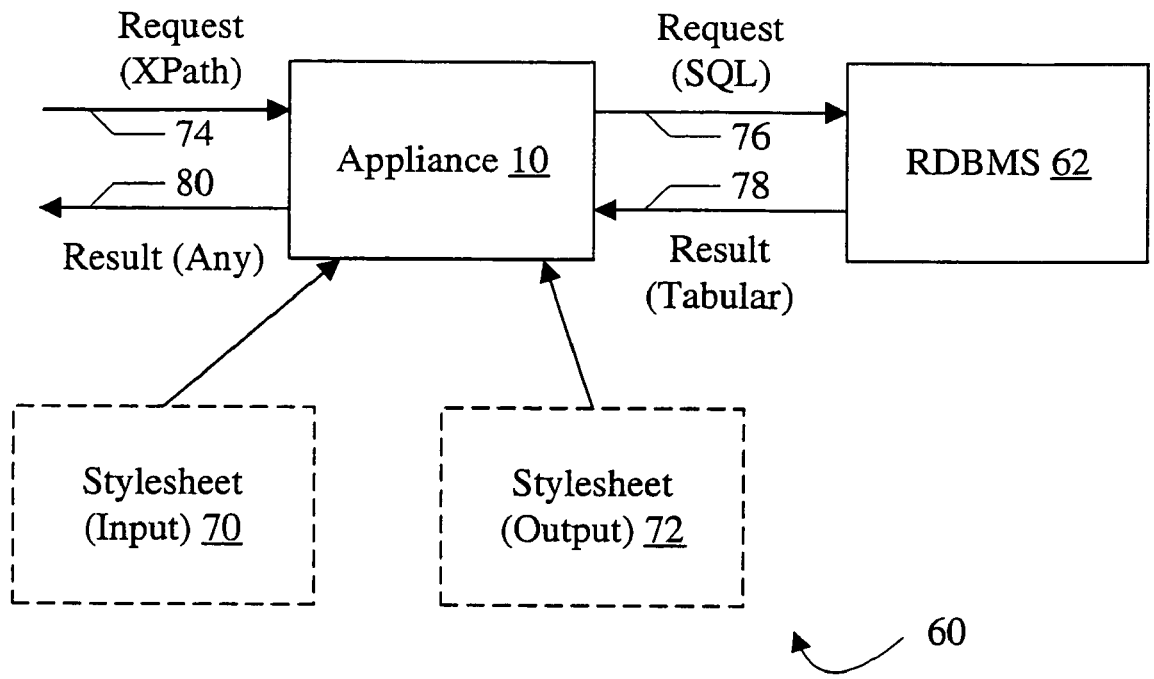
FIG. 4 is a block diagram of one embodiment of the appliance being used as a database proxy.
FIG. 5 is a diagram illustrating one embodiment of a default output format employed by one embodiment of the appliance shown in FIG. 4.
FIG. 6 is a diagram illustrating a second embodiment of a default output format employed by one embodiment of the appliance shown in FIG. 4.

FIG. 4 illustrates one embodiment of the appliance 10 being used as the database proxy 60 for the RDBMS server 62. The database proxy 60 includes the appliance 10 and optionally the stylesheets 70 and 72. The appliance 10 may be coupled to receive requests 74 from a requestor (e.g. from the application server 58A), and may be configured to generate corresponding requests 76 to the RDBMS server 62. The RDBMS server 62 may respond with a result 78 of the request, which the appliance 10 may receive and may convert to the result 80 in a format desired by the application server 58A. Optionally, an input stylesheet 70 and/or an output stylesheet 72 may be used by the appliance 10.

The request received by the appliance 10 may be in any format. For example, the request may be an XPath expression or expressions, if the application server 58A views the database as an XML database. The appliance 10 may transform the XPath expressions into SQL requests, and may transmit the SQL requests to the RDBMS server 62. The input stylesheet 70 may be used for this transformation. Alternatively, the software 28 may receive the XPath expression(s), and may generate the corresponding SQL statement(s) for each expression. In still other embodiments, the request from the application server may be in the form of a stylesheet that contains several XPath expressions to be applied to the database. The input stylesheet 70 may be included as part of the request 74, in some embodiments.

Alternatively, the request may be one or more SQL statements to access the database. The appliance 10, in this case, may transmit the SQL statements to the RDBMS server 62. The result 78 from the DBMS server 62 may still be transformed by the appliance 10 to another desired format for the result 80, in some such embodiments. In still other embodiments, the request may be provided in another format, and the input stylesheet 70 may be used to transform the input format to one or more SQL statements.

The appliance 10 may transmit the SQL statements to the RDBMS 62. For example, the software 28 may be configured to transmit the statements, whether they are received directly from the requestor or are generated by the appliance 10 from the input request received from the requester. The RDBMS server 62 processes the request 76 and provides the result 78 in a relational format. For example, the format of the result 78 may be tabular: a table of records that result from the SQL statements. Each record may have a set of columns, or fields, as defined in the database(s) managed by the RDBMS server 62. More particularly, at least one of the columns may contain a primary key of the database. Generally, a "key" may be a field of the database that may be used to sort data. A "primary key" may be a key that has a unique value in each record in the database. In some cases, the primary key may be one column in the record. In other cases, the primary key may be a combination of two or more of the columns in the record.

The appliance 10 may transform the result 78 from the output format of the RDBMS 62 to the desired format for the result 80. The output stylesheet 72 may be used to specify the desired format, in some embodiments. In other embodiments, a default output format may be supported by the appliance 10. For example, a default XML format may be supported, which is illustrated in FIGS. 5 and 6. Other embodiments may support a default format in any markup language, or in any other desired format.

FIG. 5 illustrates one embodiment of a default format 82 in the case that each record includes a primary key in one column. For this embodiment, the primary key is mapped to an XML element. Each other column, or field, of the record is mapped to an attribute of the element (e.g. Attr1 is equal to the value in column 1 of the record, Attr2 is equal to the value in column 2 of the record, etc. up to AttrN is equal to column N of the record).

FIG. 6 illustrates one embodiment of a default format 84 in the case that each record includes a primary key that is the combination of two or more columns. For this embodiment, a parent element is created. The parent element may include attributes for each non-primary key column in the record, similar to the embodiment of FIG. 5. Additionally, the parent element may include child elements. Each child element may be one of the columns of the primary key.

In some embodiments, the appliance 10 may support predefined services. Each service may be loaded onto the appliance 10, and may include the SQL statements to be transmitted to the RDBMS server 62 when the service is invoked. The service may specify one or more triggering conditions that cause the service to be invoked, and the appliance 10 may monitor the triggering conditions to invoke the service. Alternatively, an external event may be used to invoke the service, or an explicit invocation may be transmitted by a user. The service may also, in some cases, specify the receiver of the result, which may be viewed as the request or of the access to the database. The service may include an output stylesheet 72 or another specification of the output result format. The software 28 shown in FIG. 1 may include software to support the predefined services, in some embodiments.

Embodiments similar to the embodiment of FIG. 4 may be used as proxies for content management systems or filesystems.

Figure 7:
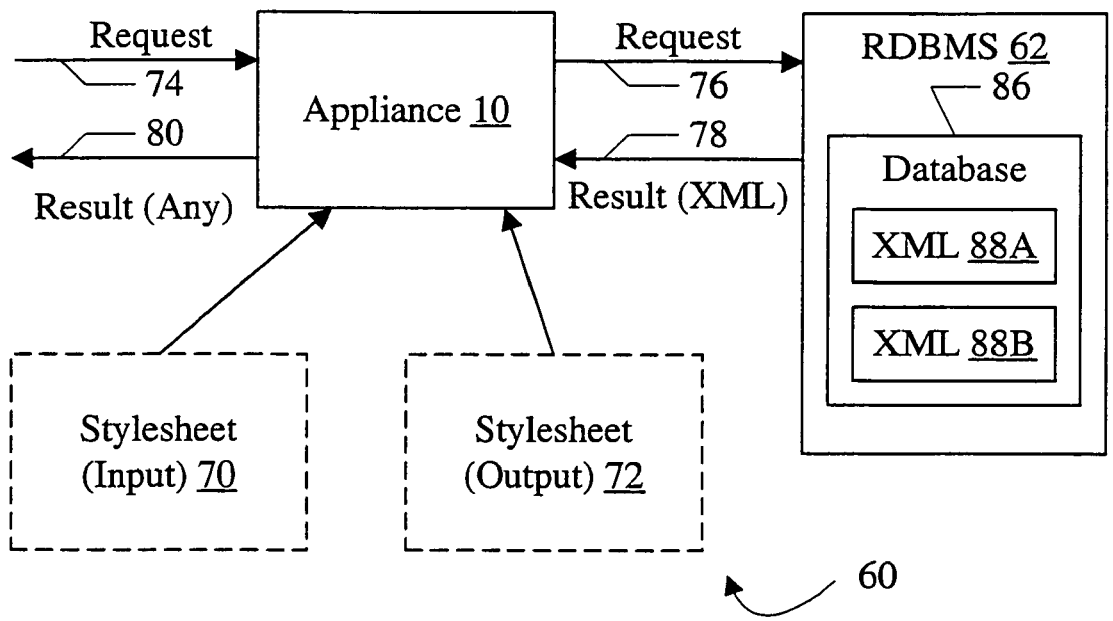
FIG. 7 is a block diagram illustrating a second embodiment of the appliance being used as a database proxy.

FIG. 7 illustrates a second embodiment of the appliance 10 being used as the database proxy 60 for the RDBMS server 62. The database proxy 60 includes the appliance 10 and optionally the stylesheets 70 and 72. Similar to the embodiment of FIG. 4, the appliance 10 may be coupled to receive requests 74 from the application server 58A and to generate corresponding requests 76 (or a service on the appliance 10 may be used instead of receiving a request 74). Also similar to the embodiment of FIG. 4, the RDBMS server 62 may return a result 78 that the appliance 10 may transform to the result 80 desired by the application server 58A. Stylesheets 70 and 72 may optionally be used. In some embodiments, the predefined services described above with regard to FIG. 4 may be used.

In the embodiment of FIG. 7, a database 86 is shown in the RDBMS server 62, and the database stores XML objects such as XML objects 88A-88B. Other embodiments may include other markup language objects. As used herein, a markup language object may be a complete markup language structure. Each markup language object may contain a record, multiple records, or a portion of a record, as desired. The database 86 may store the XML objects as records, or columns of records.

Accordingly, the result 78 may comprise one or more XML objects from the database 86. The output stylesheet 72 may specify the transformation of the XML objects to the desired result format for the result 80. For example, the desired format may be the records inside the XML objects, in a relational format (e.g. a table of records). Alternatively, XML in a different form than that stored in the database 86 may be the desired format. In other embodiments, any other format may be used.

In some embodiments, the request 74 may include one or more SQL statements to be applied to the database 86 to generate the result 78, and the appliance may pass the SQL statements on the to the RDBMS server 62 unmodified. In some embodiments, the request 74 may include one or both of the stylesheets 70 and/or 72.

In other embodiments, the database 86 may store XML data in relational form (e.g. index tables on various elements and attributes, etc.) rather than as objects in the database. The database proxy 60 may still be used in such embodiments to provide transformation of the output data from the database 86.

Figure 8:
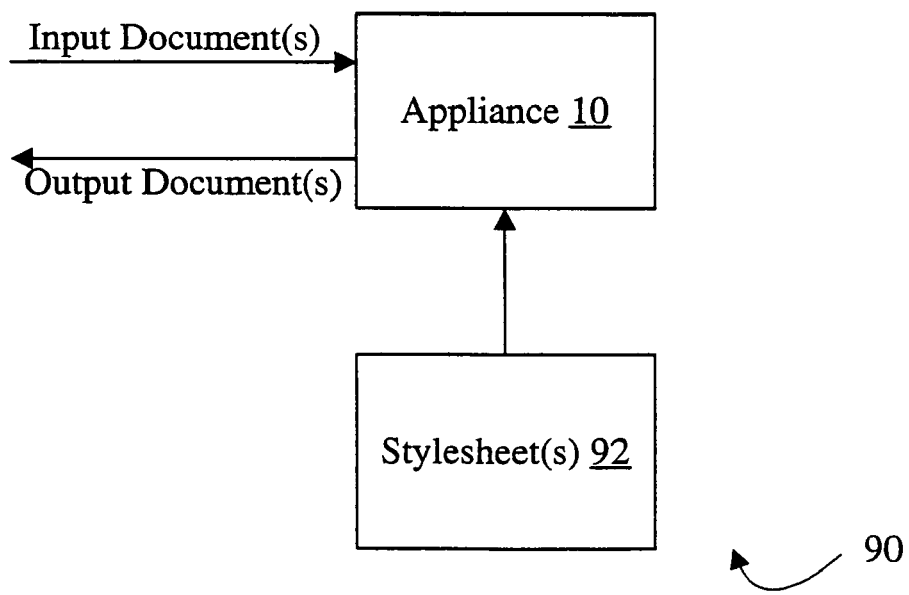
FIG. 8 is a block diagram illustrating one embodiment of a appliance being used as a rendering engine.

FIG. 8 illustrates one embodiment of the appliance 10 being used as a rendering engine 90. The rendering engine 90 includes the appliance 10 and one or more stylesheets 92 to be applied to input documents in order to generate output documents. The input documents may be in any format, and the output documents may be in any format as well. For example, formats may include: email; word processor formats such as Microsoft Word; spreadsheet formats; portable document format (PDF); various markup language formats such as SGML, HTML, XML, etc.; postscript format; etc.

Generally, the rendering engine 90 may extract portions or all of one or more input documents, and construct one or more output documents from the extracted portions. The output documents are then returned to the request or. In some embodiments, the input documents may be transmitted with a request to apply the stylesheets 92. In other embodiments, the request and/or stylesheets may identify the documents (e.g. with a uniform resource locator (URL)) and the appliance 10 may fetch the documents).

In some embodiments, the appliance 10 may support predefined services loaded into the appliance 10, similar to the discussion above of the database proxy 60. The service may define the input document(s), the output document(s), and the stylesheet(s) to be applied. In some embodiments, if more than one distinct output document is to be generated, the rendering engine 90 may cache the input documents and apply each stylesheet separately to generate a corresponding output document.

Figure 9:
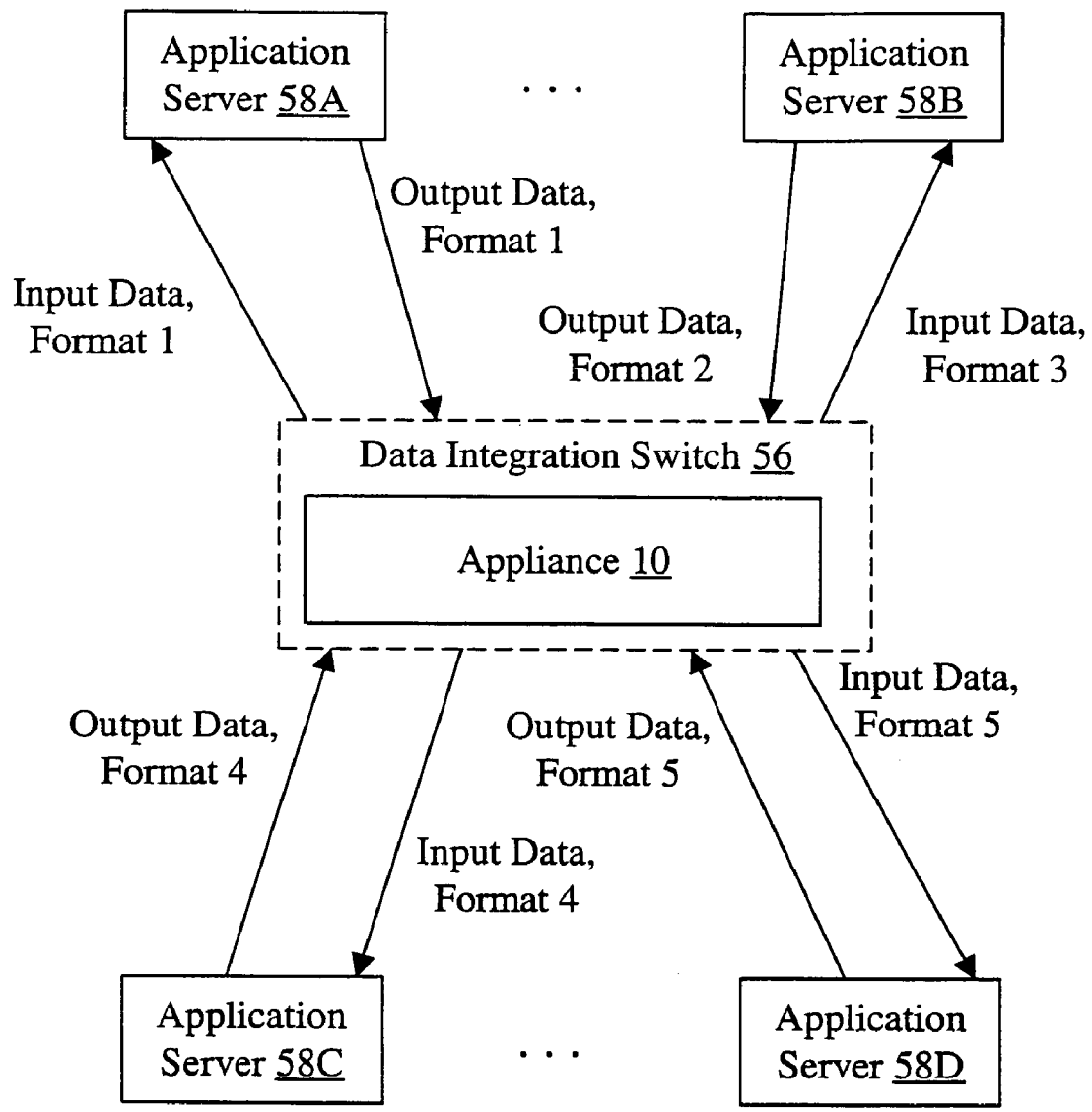
FIG. 9 is a block diagram illustrating one embodiment of the appliance being used as a data integration switch.

FIG. 9 is a block diagram illustrating one embodiment of a portion of the data center illustrated in FIG. 3. In FIG. 9, application servers 58A-58D are illustrated along with a data integration switch 56 that employs the appliance 10. In other embodiments, web servers such as the web servers 54A-54B in FIG. 3 may be included as well.

Each application server 58A-58D may be configured to output data and input data in various formats. For example, the application server 58A may output data and input data in a format 1. Similarly, the application server 58C may output data and input data in a format 4; and the application server 58D may output data and input data in a format 5. In some cases, the output data format and input data format for a given application server may differ (e.g. the application server 58B outputs data in a format 2 and inputs data in a format 3). The formats used by the various application servers 58A-58D may differ from each other. Thus, when an application server 58A-58D outputs data that is to be supplied as input data to another application server 58A-58D, the data integration switch 56 may transform the data from the source application server's output format to the target application server's input format.

More particularly, the appliance 10 may perform the transformation of the output format to the input format, passing through XML as an intermediate format. That is, the appliance 10 may covert the data from the source format to XML, and from XML to the target format. A pair of stylesheets may be used for each transformation, one stylesheet that converts from the source format to XML, and another stylesheet that converts from XML to the target format.

In some embodiments, the source data may comprise a set of separate data items arranged in a fashion dictated by the source data format (e.g. a data structure, or an ordered set of data items, or a document of any desired structure such as: email; word processor formats such as Microsoft Word; spreadsheet formats; portable document format (PDF); postscript format; database formats; electronic data interchange (EDI) formats; etc.). The source-to-XML stylesheet may be applied to a source data item to generate one or more XML constructs corresponding to the source data item, and the XML constructs may then be applied to the XML-to-target stylesheet to generate the corresponding target data item. Application of the XML-to-target stylesheet to the XML construct may be performed independent of the transformation of other source data items to XML constructs. For example, the target data item may be generated prior to the generation of XML constructs for at least some of the other source data items. Viewed in another way, application of the XML-to-target stylesheet may begin prior to completion of applying the source-to-XML stylesheet to all of the source data items.

The application of two stylesheets to a data item prior to completion of all data items through the first stylesheet may, in some embodiments, improve the throughput of the data integration switch 56 and may reduce the response time when individual data items are being transmitted between application servers 58A-58D.

Figure 10:
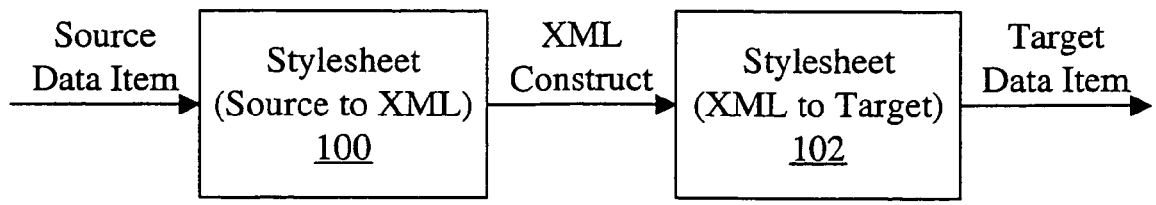
FIG. 10 is a block diagram illustrating one embodiment of the transformation of source data to target data through extensible markup language (XML) constructs.

FIG. 10 illustrates diagrammatically one embodiment of applying a source-to-XML stylesheet 100 to a source data item to generate XML construct(s), to which the XML-to-target stylesheet 102 is applied to generate the target data item.

Figure 11:
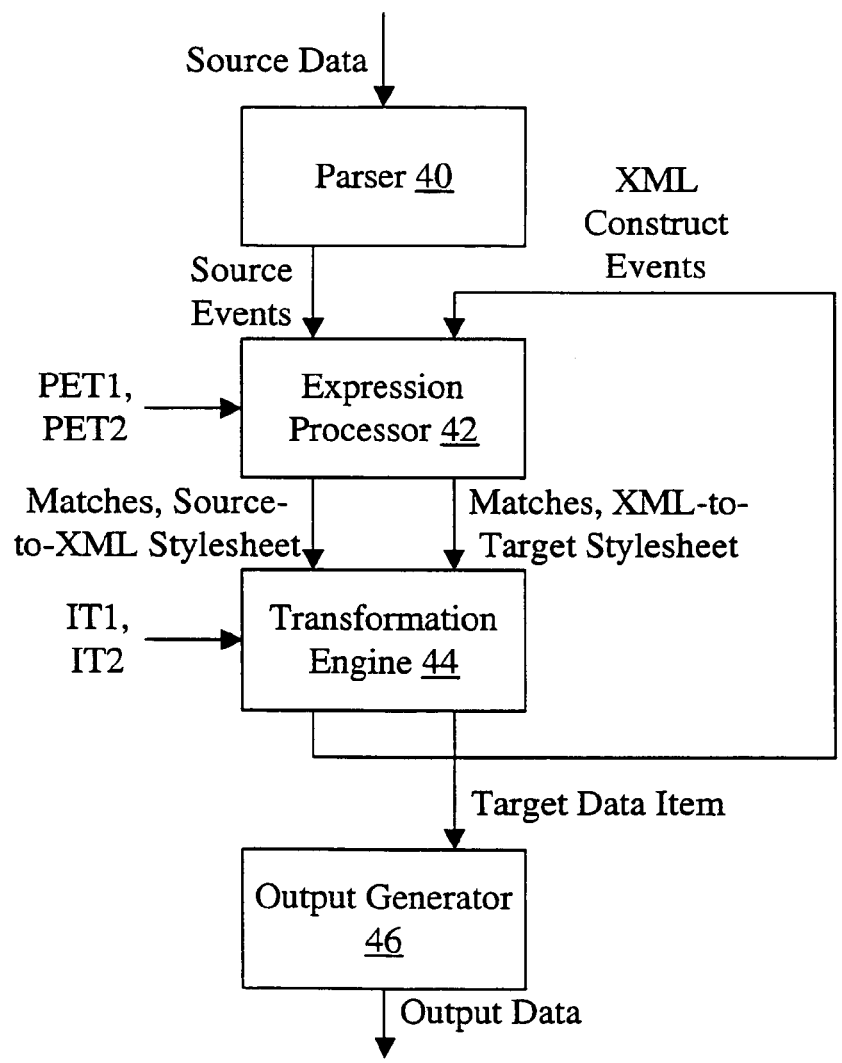
FIG. 11 is a block diagram illustrating portions of one embodiment of the appliance operating on source data to generate target data.

FIG. 11 is a block diagram one embodiment of a portion of the document processor 16 (from FIG. 2), illustrating the flow of data in one embodiment of the data integration switch 56.

The stylesheets 100 and 102 are each separately compiled into parse-time expression trees (PET1 and PET2, respectively, in FIG. 11) and instruction tables for transformation engine 44 (IT1 and IT2, respectively, in FIG. 11)

The source data is supplied to the parser circuit 40, which generates source events to the expression processor 42. The source events may identify data items within the source data. The expression processor 42 applies the source events to the PET1, and generates corresponding matches for each source data time in the source-to-XML stylesheet 100 to the transformation engine 44. The transformation engine 44 executes the instructions from IT1 to generate the XML construct corresponding to a given source data item. The transformation engine 44 may generate XML construct events from the XML construct, and may pass those events to the expression processor 42. The expression processor 42 may apply the XML construct events to the PET2, generating matches for the XML construct events in the XML-to-target stylesheet 102. The transformation engine 44 may execute the instructions from IT2 to generate the output data to the output generator 46.

In other embodiments, the transformation engine may apply the XML constructs to the XML-to-target stylesheet (e.g. the XML-to-target stylesheet may be implemented entirely in instructions executed by the transformation engine 44). In yet other embodiments, the XML construct may be passed from the transformation engine 44 to the parser circuit 40, which may parse the XML construct to generate the XML construct events for the expression processor 42. The software 28 (FIG. 1) may be used to take the XML constructs output by the transformation engine 44 and generate the XML construct events to the expression processor 42, in other embodiments.

Figure 12:
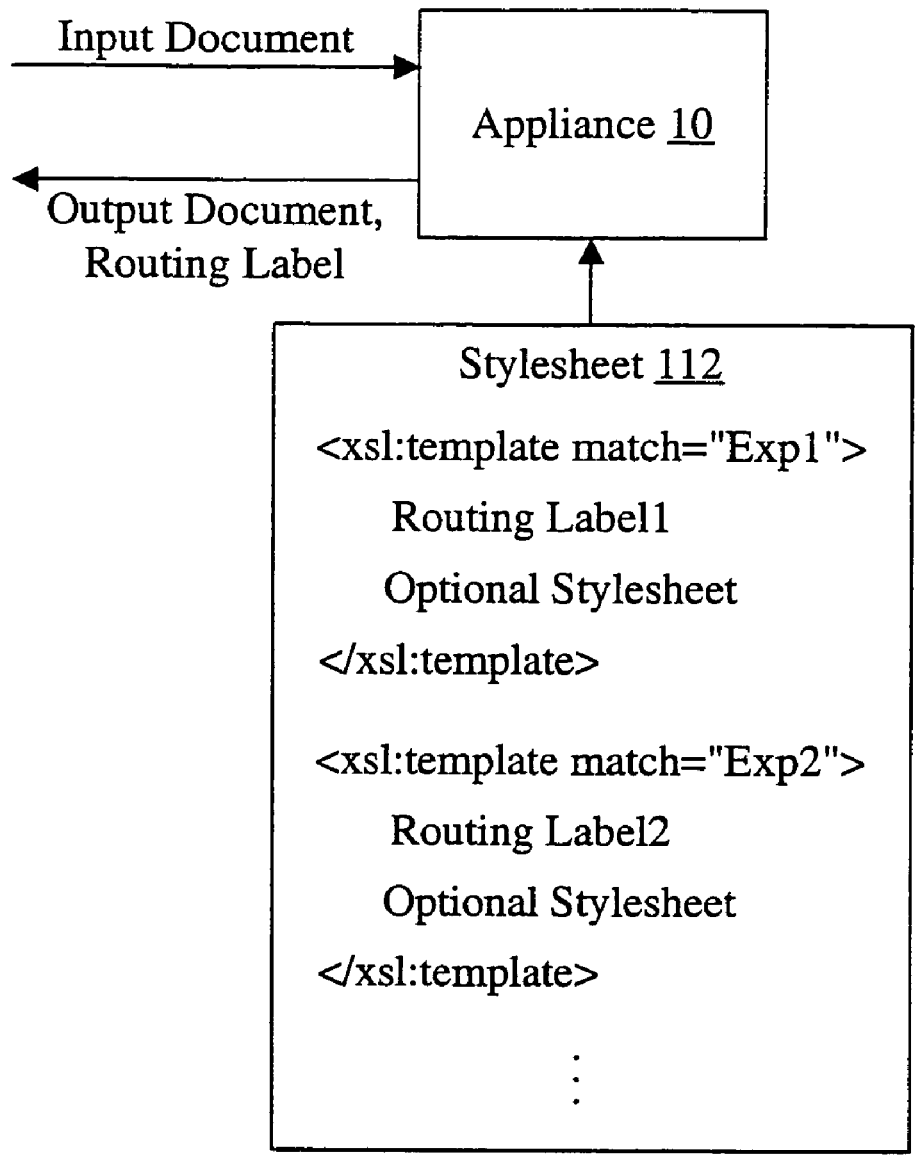
FIG. 12 is a block diagram of one embodiment of the appliance being used as an XML router.

FIG. 12 is a block diagram of one embodiment of the appliance 10 being used as an XML router 110. For example, the XML router 110 may be included in the router(s) 52 in the data center shown in FIG. 3. The XML router 110 includes the appliance 10 and a stylesheet 112.

In the XML router 110, the appliance receives an input XML document and outputs an output XML document and a routing label or location. The routing label identifies the destination for the XML document. For example, the software 28 on the appliance 10 may include software to convert the routing label to a destination IP address or addresses (e.g. through a table lookup), and the appliance 10 may route the output document to the destination IP address or addresses. Alternatively, the routing label may be used by the router(s) 52 to lookup the destination IP address or addresses, and the router(s) 52 may route the XML document to the destination IP address or addresses. In yet another alternative, the routing label may be the destination IP address or addresses.

The stylesheet 112 may include a set of XPath expressions to be applied to the input document, one of which may match a given input document. A corresponding routing label may be determined from the stylesheet. For example, in the illustrated embodiment, the stylesheet 112 may include a template for each expression (e.g. Exp1, Exp2, etc.), with the match attribute equal to that expression. The template body may include outputting the routing label (e.g. Routing Label 1, Routing Label 2, etc.). Optionally, a stylesheet may also be included in the template body. If a stylesheet is included, the appliance 10 may apply the stylesheet to the input document to generate the output document. Otherwise, the input document may be supplied unchanged as the output document. In other embodiments, a transformation stylesheet may be applied unconditionally (i.e. not as a function of which expression is matched).

Figure 13:
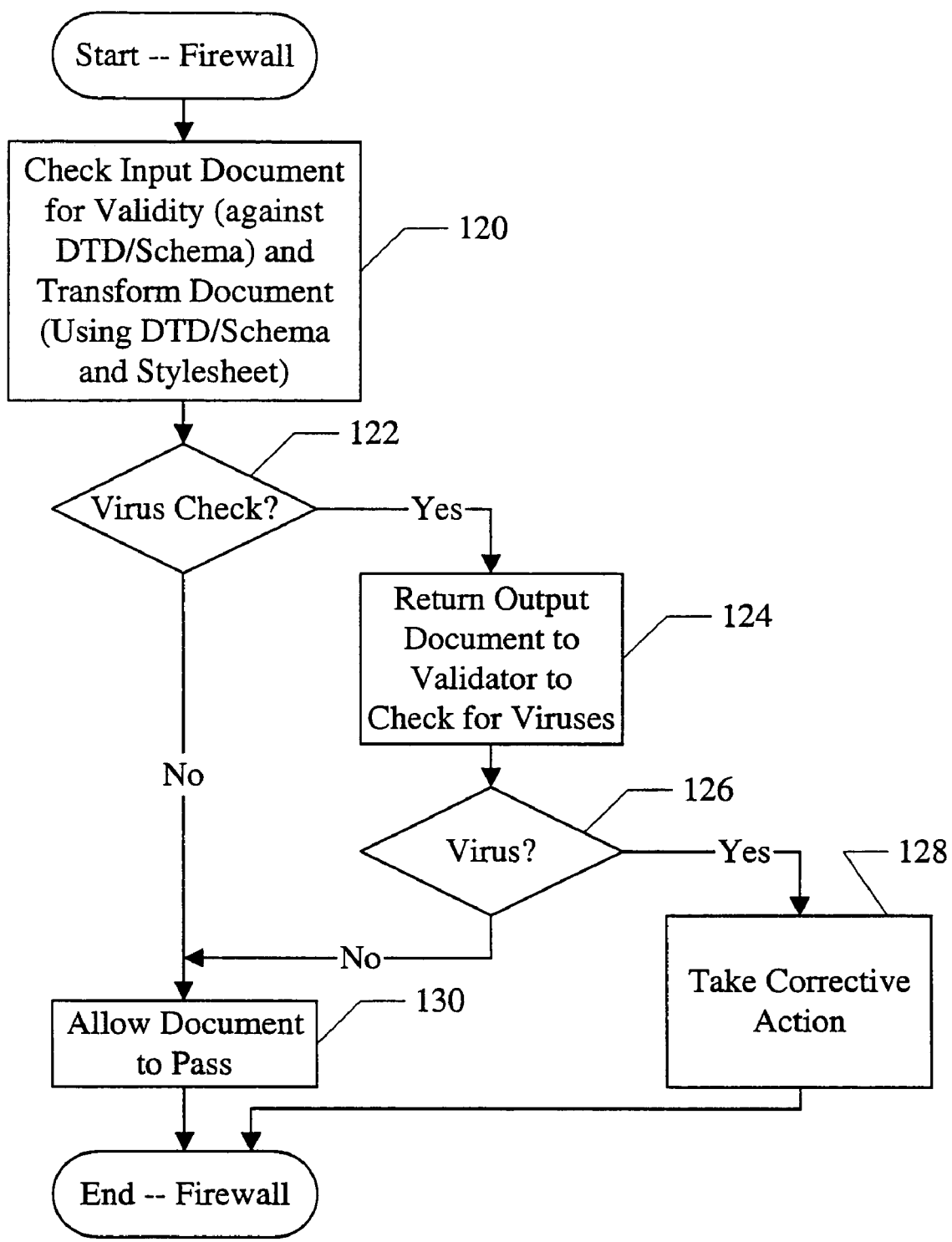
FIG. 13 is a flowchart illustrating operation of one embodiment of the appliance as a virus checker.

Turning next to FIG. 13, a flowchart illustrating operation of one embodiment of the appliance 10 when used in a firewall (e.g. the firewall 50). In this embodiment, the appliance 10 may perform document validation against a DTD/schema and may also perform intrusion detection (e.g. virus detection). In this context, viruses may include viruses as well as worms, Trojan horse software, etc. Generally, viruses may comprise software written with a nefarious intent for the computer system on which the software executes (e.g. destruction of data or software on the computer system, reduction of computer system resources available for other software, etc.), with the intent to replicate to other computer systems, or to execute on the computer system with nefarious intent for another computer system (e.g. launching a denial of service attack).

XML documents may present additional difficulties for virus detection as compared to standard virus detection. In standard virus detection, the incoming bit stream is compared to a database of bit strings of known viruses and, if a portion of the incoming bit stream matches the database, it is identified as a virus. With an XML document, the virus may be distributed across the XML document. For example, portions of the virus may be in different elements. When the elements are combined (e.g. through processing the document by a stylesheet), the virus is created. Still further, the virus may be partly included in the XML document and partly included in a corresponding DTD/schema (e.g. in an entity reference or attribute default) and/or stylesheet to be applied to the XML document. Thus, none of the above contain a virus in isolation, but a virus may be created by processing the XML document with the DTD/schema and/or stylesheet. In yet another complication, the XML document, the DTD/schema, and the stylesheet may arrive at different times, thus making a virus distributed among them difficult to detect. An attacker may even write an XML document that, when processed using existing, valid DTD/schema and/or stylesheets, creates a virus.

The appliance 10 may address the virus creation in a two step process. In the first step, the XML document may be validated using the DTD/schema and transformed using the stylesheet, as needed. The resulting document may then be passed through the appliance 10 again in the second step, in which case the validator 48 may check for viruses in the resulting document. For example, the validator 48 may be provided within a virus database as described above. In other embodiments, coarser levels of intrusion detection may be applied (e.g. traffic from or two certain addresses may be detected).

FIG. 13 illustrates the two step process. The input document is received, and is checked for validity (against the DTD/schema, e.g. in the validator 48) and the document is transformed (using the DTD/schema and the stylesheet) (block 120). Then, if virus checking is to be performed (decision block 122, "yes" leg), the output document is returned to the validator 48 to check for viruses (block 124). If a virus is detected (decision block 126, "yes" leg), the appliance 10 may take corrective action (block 128). For example, the virus may be repaired as a corrective action. Alternatively, the document may be dropped (not permitted to pass into the data center) or quarantined on the appliance 10 or elsewhere for later review by an administrator. If virus checking is not to be performed (decision block 122, "no" leg) or no virus is detected (decision block 126, "no" leg), the document maybe allowed to pass into the data center (block 130).

Numerous variations and modifications will become apparent to those skilled in the art once the above disclosure is fully appreciated. It is intended that the following claims be interpreted to embrace all such variations and modifications.

What is claimed is:

1. An computer implemented apparatus comprising:
an appliance configured to generate a request; and
a computer system configured to run a database management system (DBMS) that manages one or more databases that store content including one or more markup language objects, wherein the computer system is coupled to the appliance to receive the request, and wherein the DBMS is configured to process the request in at least one or the one or more databases, and wherein the computer system is configured to return a result of the request having at least a subset of the one or more markup language objects to the appliance in a first format; and
wherein the appliance is configured to transform the result to a second format for return to a requestor corresponding to the request, and further wherein the result is validated and transformed using at least a stylesheet by the appliance and the validated and transformed result is passed through the appliance a second time to be processed by a validator to check for viruses in the resulting document.

2. The apparatus as recited in claim 1 wherein the second format is expressed in a markup language.

3. The apparatus as recited in claim 2 wherein the second format comprises a default format supported by the appliance.

4. The apparatus as recited in claim 3 wherein, if the result includes a primary key contained in one column, the default format comprises:
an element comprising the primary key; and
one or more attributes of the element, each of the attributes comprising one other column of the result.

5. The apparatus as recited in claim 3 wherein, if the result includes a primary key that includes more than one column, the default format comprises a first element having each non-primary key column of the result as attributes.

6. The apparatus as recited in claim 5 wherein the default format further comprises a plurality of second elements, wherein each of the plurality of second elements comprises one of the columns of the primary key, and wherein each of the plurality of second elements is a child of the first element.

7. The apparatus as recited in claim 2 wherein the appliance is coupled to receive one or more stylesheets that define the second format.

8. The apparatus as recited in claim 1 wherein the appliance is coupled to receive a second request from the requestor, and wherein the appliance is configured to generate the request to the computer system responsive to the second request.

9. The apparatus as recited in claim 8 wherein the second request comprises one or more stylesheets comprising one or more expressions to be applied to the one or more databases.

10. The apparatus as recited in claim 1 wherein at least some content of the one or more databases comprises one or more markup language objects, and wherein the result includes at least one markup language object.

11. The apparatus as recited in claim 10 wherein the second format comprises a format supported by the DBMS.

12. A computer implemented method comprising:
transmitting, via an appliance, a request to a database management system (DBMS) having at least a portion of content being one or more markup language objects;
receiving, with the appliance, a result from the DBMS in a first format including at least a subset of the one or more markup language objects;
transforming, with the appliance, the result to a second format for transmission to a requestor corresponding to the request during a first pass through the appliance; and
utilizing a validator to check for viruses in the resulting document during a second pass through the appliance, wherein the validator is a component of the appliance.

13. The method as recited in claim 12 wherein the second format is expressed in a markup language.

14. The method as recited in claim 13 wherein the second format comprises a default format supported by the appliance.

15. The method as recited in claim 14 wherein, if the result includes a primary key contained in one column, the default format comprises: an element comprising the primary key; and one or more attributes of the element, each of the one or more attributes comprising one other column of the result.

16. The method as recited in claim 14 wherein, if the result includes a primary key that includes more than one column, the default format comprises a first element having each non-primary key column of the result as attributes.

17. The method as recited in claim 16 wherein the default format further comprises a plurality of second elements, wherein each of the plurality of second elements comprises one of the columns of the primary key, and wherein each of the plurality of second elements is a child of the first element.

18. The method as recited in claim 13 further comprising defining the second format in one or more stylesheets provided to the appliance.

19. The method as recited in claim 12 further comprising:
the appliance receiving a second request from the requestor; and
the appliance generating the request to the computer system responsive to the second request.

20. The method as recited in claim 19 wherein the second request comprises one or more stylesheets comprising one or more expressions to be applied to the one or more databases.

21. The method as recited in claim 12 wherein at least some content of the one or more databases comprises one or more markup language objects, and wherein the result includes at least one markup language object.

22. The method as recited in claim 21 wherein the second format comprises a format supported by the DBMS.

* * * * *